(12) United States Patent
Darrett

(10) Patent No.: US 8,746,762 B2
(45) Date of Patent: Jun. 10, 2014

(54) CAR DOOR SHOCK ABSORBER

(71) Applicant: Steven Darrett, Victorville, CA (US)

(72) Inventor: Steven Darrett, Victorville, CA (US)

( * ) Notice: Subject to any disclaimer, the term of this patent is extended or adjusted under 35 U.S.C. 154(b) by 0 days.

(21) Appl. No.: 13/759,849

(22) Filed: Feb. 5, 2013

(65) Prior Publication Data

US 2013/0320684 A1 Dec. 5, 2013

Related U.S. Application Data

(60) Provisional application No. 61/655,460, filed on Jun. 4, 2012.

(51) Int. Cl.
*B60R 19/42* (2006.01)
*B60R 13/04* (2006.01)
*B60R 13/02* (2006.01)

(52) U.S. Cl.
CPC ........... *B60R 13/043* (2013.01); *B60R 13/0243* (2013.01)
USPC ..................... 293/128; 296/146.1; 296/187.12

(58) Field of Classification Search
USPC ............ 296/146.1, 97.23, 126, 128; 293/128, 293/126; 280/770
See application file for complete search history.

(56) References Cited

U.S. PATENT DOCUMENTS

| | | | |
|---|---|---|---|
| 3,704,037 A * | 11/1972 | Glassberg | 293/128 |
| 4,025,098 A | 5/1977 | Powaska | |
| 4,029,306 A | 6/1977 | Sakaguchi | |
| 4,095,831 A | 6/1978 | Seki | |
| 4,217,715 A | 8/1980 | Bryan, Jr. | |
| 4,530,519 A | 7/1985 | Marshall | |
| 5,129,695 A * | 7/1992 | Norman, II | 293/128 |
| 5,312,145 A * | 5/1994 | McNeil | 293/128 |
| 5,799,992 A * | 9/1998 | Kojima | 293/128 |
| 6,062,617 A * | 5/2000 | Marks | 293/128 |
| 6,457,755 B1 * | 10/2002 | Nieto | 293/128 |
| 6,769,725 B2 * | 8/2004 | Ko | 293/128 |
| 7,354,083 B1 | 4/2008 | Obermann | |
| 8,109,557 B1 * | 2/2012 | Salinas | 296/97.23 |
| 2003/0062732 A1 * | 4/2003 | Molina | 293/128 |
| 2003/0133746 A1 | 7/2003 | Pan | |
| 2007/0108780 A1 * | 5/2007 | Udolph | 293/128 |
| 2008/0258482 A1 * | 10/2008 | Udolph | 293/128 |
| 2010/0007169 A1 | 1/2010 | Nguyen | |
| 2010/0156414 A1 | 6/2010 | Sakellariou | |
| 2011/0155491 A1 | 6/2011 | Ve Lasco | |
| 2011/0156414 A1 | 6/2011 | Gonin | |

* cited by examiner

*Primary Examiner* — Glenn Dayoan
*Assistant Examiner* — Pinel Romain
(74) *Attorney, Agent, or Firm* — Steven L. Fisher-Stawinski; Robert W. Gray; The Gray Law Group, Ltd

(57) ABSTRACT

The inventive device disclosed in the present application is a set of shock-absorbent panels that attach to the doors of a vehicle. The system is designed so each of the panels may be easily hooked onto the car doors and locked in place when the doors are closed, protecting the vehicle from collisions and objects which may inadvertently bump the doors, causing unsightly dents and scratches.

7 Claims, 1 Drawing Sheet

CAR DOOR SHOCK ABSORBER

CROSS-REFERENCE TO RELATED APPLICATIONS

This application claims priority to U.S. Provisional Application No. 61/655,460 filed on Jun. 4, 2012.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

This invention generally relates to car parts and accessories, and more in particular refers to a set of shock-absorbent designed to attach to the doors of a vehicle protecting it from collisions and objects which may inadvertently bump the doors, causing unsightly dents and scratches.

2. Brief Description of the Prior Art

Car bumpers and shock absorbers are well known in the art. For example U.S. Pat. Nos. 4,029,306; 4,095,831 and U.S. Published Patent Application 20030133746 and 20110155491 are directed to various kinds of car bumpers, shock absorbers and side shields. These patents documents demonstrate that it is generally known how build a car side shield.

In addition to that, U.S. Pat. No. 4,025,098 to Powaska provides for a bumper assembly for a motor vehicle includes a pair of movable side bumpers adapted to be received by the sides of the automobile. Under the teachings of Powaska, the movable rear and forward bumper are joined in tandem to each other. A pair of first bumper rods welded to the forward bumper extend rearwardly into a pair of channel bar members affixed onto the frame of the motor vehicle. A pair of second bumper rods welded to the rear bumper extend forwardly into the channel bar member. A shock absorbing mechanism communicates between each set of first and second rod within each said channel bar member.

U.S. Pat. No. 4,217,715 to Bryan, Jr. discloses and claims a simplified sturdy and economical side guard or protector for automobiles is manually operated and requires no power assistance. The support frame of the protector provided by Bryan Jr. is slidable in simple guide brackets secured to the bottom of the vehicle. When extended for use, the active portion of the protector is swung to an upright position where it can protect the most vulnerable areas of the automobile body against denting and scratching commonly caused by the swinging doors of other vehicles. The protector can also support letters or ornamental characters in a provided trackway. Rubber bumpers on the protector engage adjacent side portions of the vehicle.

U.S. Pat. No. 7,354,083 to Obermann discloses a protective guard assembly for the protection of vehicles from parking lot. In one of its preferred embodiments, the protective apparatus disclosed by Obermann may comprise a pair of extendable rotator arms with a tensioned cable extended therebetween. In its non-deployed position, the present invention may be mounted underneath the vehicle to maintain the outer appearance of the vehicle. In its deployed position, the present invention may provide a pair of fore and aft canted arms with the tensioned cable therebetween, such arms having extended from underneath said vehicle and rotated upward to extend said cable at approximately the height of the outermost portion of the generally curved vehicle body.

More recently, U.S. Published Patent Application No 20110156414 by Vincent Gonin et al., disclosed a bumper assembly is adapted for a motor vehicle having a structure including a pair of upper side members and a pair of lower side members. The Gonin bumper assembly includes an energy absorbing panel having at least two columns each provided to bear on the ends of an upper side member and a lower side member and a beam extending transversely between the columns. According to a first preferred embodiment of the Gonin device, the bumper assembly includes a plate doubling the beam such that the beam is compressed between a frontal face of the plate in case of impact.

Finally U.S. Published Patent Application No. 20110155491 by Angel Ve Lasco et al., directed to a Side Converger for Vehicle Front Face Structure, Corresponding Front Face Structure, and Method for Assembling such a Structure discloses side diffuser for a vehicle front surface structure, the vehicle front surface structure, and a method for assembling such a structure. The side diffuser guides air entering through air inlets from bumpers of the vehicle to heat exchangers located in front of the engine.

Despite all the efforts listed above prior art patents describe structures that are either not truly convenient or else involve complicated, expensive, and overly difficult assembly and/or disassembly parts and procedures.

SUMMARY OF THE INVENTION

Accordingly, the invention is directed to a set of shock-absorbent panels that attach to the doors of a vehicle. The system is designed so each of the panels may be easily hooked onto the car doors and locked in place when the doors are closed, protecting the vehicle from collisions and objects which may inadvertently bump the doors, causing unsightly dents and scratches. The inventor commonly refers to the Car Door Shock Absorbers of the present application as the: "Max-Shield".

It is then the principal object of the present invention is to prevent dints and scratches to a car body. It is a secondary objective of the present invention is to provide for a device that is easy to install and uninstall and that does not require any complicated power connection.

It is an additional objective of the present invention to provide a device that does not rust or deteriorates over time. It is a final objective of the present invention to provide for a device that is cheap to set up, but that can eventually be sold at a premium.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated

DETAILED DESCRIPTION OF THE INVENTION

The inventive device disclosed in the present application is a set of shock-absorbent panels that attach to the doors of a vehicle. The system is designed so that each of the panels may be easily hooked onto the car doors and locked in place when the doors are closed, protecting the vehicle from collisions and objects which may inadvertently bump the doors, causing unsightly dents and scratches. As it can be inferred from the drawings important elements of the inventive device include: a plurality of rubber hooks, a plastic base, a rubber protection, a strap, and one or more latch closures.

This system of protective panels is made of dense, shock absorbent foam and it features non-scratching hooks that latch onto the top and bottom rim of each vehicle door to provide easy and precise placement of the panels. The hooks are affixed to the protective panels by flexible fabric straps. Some of or all of the straps, preferably at least the top ones, are provided with a cinch mechanism such that they may be adjusted to fit vehicle doors of varying sizes. When parked, the driver attaches the panel to the outside of a vehicle door by hooking it to the top and bottom edge of the door. The driver then closes the door to secure the panel in place. When the panels are in place, the driver can confidently go about their business with confidence that their vehicle is protected from inadvertent parking lot damage.

While protection is the primary function of this invention, the secondary feature of the invention sets it apart from similar car exterior accessories and is what will be the most appealing feature for manufacturers, distributors, marketers, retailers and investors: the panels can be personalized and can feature advertisements, company logos, including well-known and relevant trade marks (e.g. Nike, UnderArmor, Hilton, Four Seasons, etc.), as well as university teams, charities and causes (i.e. Breast Cancer Awareness, Make-A-Wish Foundation, etc.), professional teams of the NFL, MLB, NHL, NBA, FIFA, etc.

Figure 1:
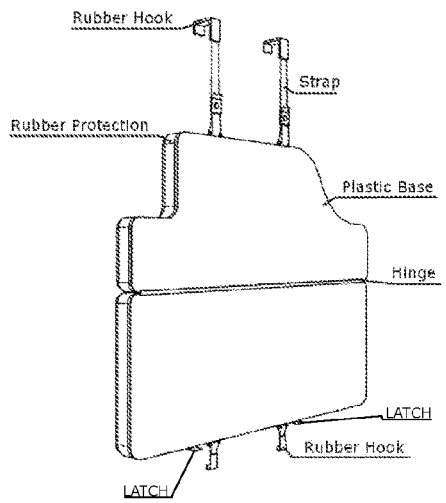
FIG. 1 is a first perspective view of the first exemplary embodiment in accordance with the teachings of the present invention.
Figure 2:
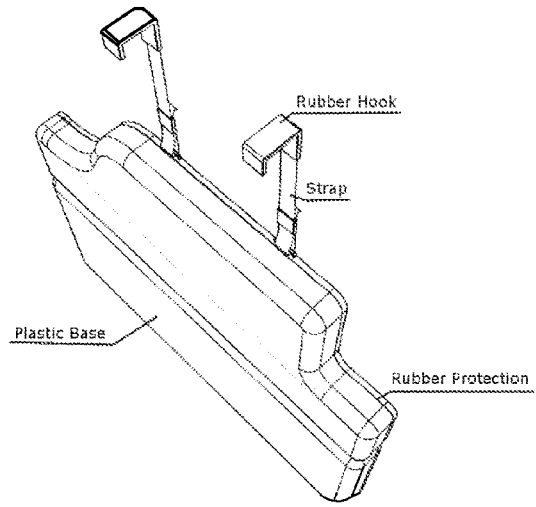
FIG. 2 is a second perspective view of the first exemplary embodiment.
Figure 4:
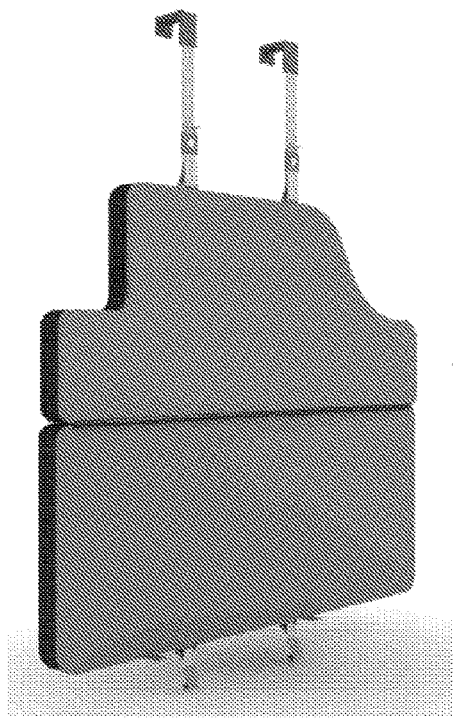
FIG. 4 is a three dimensional (3-D) rendering of one of a second preferred embodiments of the invention of the present application.
Figure 3:
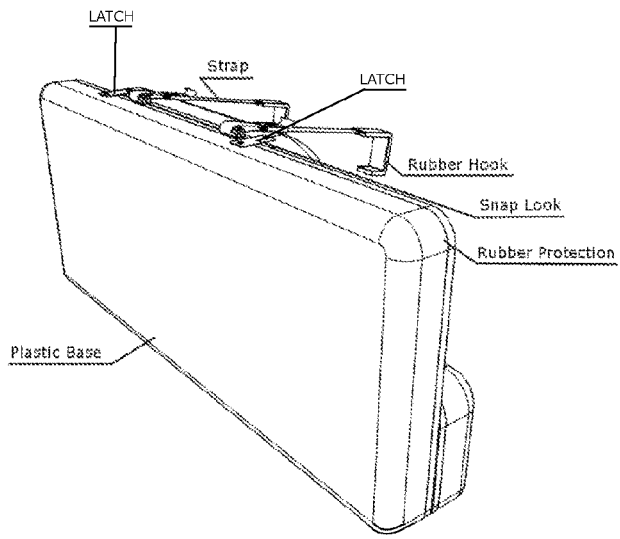
FIG. 3 is a third perspective view of the first exemplary embodiment in its closed configuration.

Alternatively, the consumer may choose solid color panels, optionally with brand indicia to match the vehicle or suit preference. The panel system will be available in various sizes to fit compact, mid-size, and sport utility vehicles. When not in use, the lightweight panels easily stack together and take up very little space in the trunk or interior cabin of the vehicle. The panel system may be folded over itself at the hinged separation point between the panels and secured in a folded over itself at the hinged latches as shown in the configuration of FIG. 3. Benefits of using the invention of the present application include: (a) Prevent dents and scratches caused to vehicle when parked, (b) Protect valuable investment in vehicle, (c) Provide personal expression through customized panels on Max Shield, (d) Extremely user-friendly, with quick, simple installation, (e) Panels stack easily for compact storage. Advantages over existing solutions include: (f) Cost savings because only one embodiment of the invention need be purchased to protect complete perimeter of vehicle versus paying for auto body repairs, (g) Customization and opportunity for advertising which is not an option with similar products.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A vehicle side shield comprising:
   (a) a first rigid panel;
   (b) said first rigid panel having a front face, a back face, a bottom edge, a top edge, said top edge having a length less than or equal to the length of said bottom edge, and such additional edges as to create an outline shape approximately conforming to the upper side profile of a motor vehicle;
   (c) said bottom edge of said first rigid panel being straight and horizontal and said top edge being straight and horizontal;
   (d) a second rigid panel;
   (e) said second rigid panel having a front face, a back face, a top edge, a bottom edge, and two side edges such that said second rigid panel has an approximately rectangular outline shape having a height about equal to the height of said first rigid panel;
   (f) said top edge of said second rigid panel being rotatably affixed to said bottom edge of said first rigid panels;
   (g) said first and second rigid panels being capable of being moved into a first position wherein said back face of said first rigid panel opposes said back face of said second rigid panel, and wherein said top edge of said second rigid panel is aligned with said top edge of said first rigid panel;
   (h) said first and second rigid panels being capable of being moved into a second position wherein said top edge of said second rigid panel opposes said bottom edge of said first rigid panel;
   (i) a plurality of latches, each having a first portion and a second portion such that said first portion may be releasably engaged to said second portion;
   (j) each of said first portions of said plurality of latches being fixedly attached to said top edge of said first rigid panel, and each of said second portions of said plurality of latches being fixedly attached to said bottom edge of said second rigid panel, such that said first portions of said plurality of latches may be engaged to said second portions of said plurality of latches when said first and second rigid panels are arranged in said first position;

(k) a first plurality of hooks;

(l) said first plurality of hooks being rotatably affixed to said lower edge of said second rigid panel;

(m) a second plurality of hooks; and (n) said second plurality of hooks being rotatably attached to said top edge of said first rigid panel;

whereby said first plurality of hooks may be fastened to the lower edge of a vehicle door and said second plurality of hooks may be fastened to the upper edge of the same vehicle door, thus creating a protective shield of said first and second rigid panels with said back faces of said first and second rigid panels opposing the side of the vehicle.

2. The vehicle side shield of claim 1 wherein said first and second rigid panels are constructed of a high density plastic foam material.

3. The vehicle side shield of claim 1 wherein said back face of said first and second rigid panels is covered with a shock absorbing rubber material.

4. The vehicle side shield of claim 1 wherein said first and second pluralities of hooks are covered with a shock absorbing rubber material.

5. The vehicle side shield of claim 1 wherein each of said second plurality of hooks is affixed to said first rigid panel by a flexible strap.

6. The vehicle side shield of claim 5 wherein each of said flexible straps is affixed to said top edge of said first rigid panel via an adjustable cinch mechanism, whereby said straps are made adjustable in length.

7. The vehicle side shield of claim 6 wherein said first and second rigid panels are constructed of a high density plastic foam material; said back face of said first and second rigid panels is covered with a shock absorbing rubber material; and the vehicle side shield of claim 1 wherein said first and second pluralities of hooks are covered with a shock absorbing rubber material.

* * * * *